Patented May 9, 1939

2,157,111

UNITED STATES PATENT OFFICE 2,157,111

RECHARGEABLE DRY CELL BATTERY

Charles F. Bonilla, New York, N. Y., assignor to Bates Laboratories, Inc., New York, N. Y., a corporation of New York No Drawing. Application December 7, 1934, Serial No. 756,559

2 Claims. (Cl. 136—102)

The present invention is generally concerned with rechargeable dry cell batteries and particularly with a dry cell battery having an exterior zinc casing constituting one electrode and an interior carbon rod appropriately disposed in a depolarizing mixture constituting the second electrode of the battery which includes an intervening gelatinous electrolyte interposed between the depolarizing mixture and the zinc casing, the dry cell battery referred to being commonly known in the art as the Leclanché type. Specifically, the invention is especially directed to a dry battery of the character referred to adapted to be electrically recharged or reconditioned by passing therethrough an electrical current in opposition to its internal electromotive force.

Hitherto difficulty has been experienced in recharging or reconditioning a dry cell battery in that its internal resistance increased continuously in proportion to the time during discharge periods and during recharging periods the internal resistance did not appreciably reduce, due to the presence of insoluble precipitates, such as zinc ammonia chloride or other crystals, which formed in the electrolyte and which are not decomposed by a recharging electrical current. Accordingly, a primary object of the invention is to provide a dry cell battery in which the tendency of accumulation of crystalline precipitates is minimized thus improving the operating characteristics of the battery for a larger number of operating cycles, each comprising discharging and recharging periods.

According to the invention, the electrical connections employed in recharging the dry cell battery, of the type alluded to, are similar to those utilized in recharging a conventional storage battery, except that the voltage regulation or change of voltage with percentage recharge of the cell of the battery is greater and is taken into consideration in the designing of a recharger system, forming no part of the present disclosure. It has also been ascertained that the internal resistance of a cell of a dry battery varies with the number of discharge and recharge cycles to which the battery has been subjected to and is also dependent upon the shelf life thereof and consequently its closed circuit terminal voltage during recharge is not a true indication of the state of charge of the battery.

In the operation of an ordinary Leclanché type of dry cell battery having ammonium chloride as the chief ingredient of the electrolyte, it is generally accepted that the anode reaction, or that occurring in the battery according to the invention at the zinc electrode is as follows:

(1) Zn plus $2Cl^-\rightarrow ZnCl_2$ plus 2 electrons

At the cathode the reactions are:

(2) $NH^+_4$ plus 2 electrons $\rightarrow 2NH_3$ plus $H_2$ and (3) $H_2$ plus $2MnO_2 \rightarrow H_2O$ plus $Mn_2O_3$ The ammonia ($NH_3$) thus liberated at the cathode dissolves in the electrolyte and diffuses back to where the $ZnCl_2$ is dissolved. When the two meet, the following reaction occurs:

$ZnCl_2$ plus $2NH_3 \rightarrow ZnCl_2.2NH_3$, the product of which as soon as its solubility is reached, precipitates and decreases the conductivity of the cell.

When the cell is not to be recharged electrically, the disadvantage of increased resistance, however, is more than compensated for by the removal of ammonia from the electrolyte by the precipitate. The ammonia would otherwise render the cell polarized and inoperative and decrease the cell's normal and useful life.

If the cell is recharged, for example, by passing therethrough a direct current having a voltage considerably greater than its internal electromotive force and in opposition thereto I have found that the precipitate does not dissolve and decompose, reversing the reactions which formed it, as above enumerated. It follows therefore that each cycle of discharge and recharge further depletes the supply of $NH_4Cl$ in the electrolyte and further increases the internal resistance of the cell up to a relatively high point. However, Reaction (3) at the carbon electrode I have found to be reversible during recharge at which time the lower manganese oxides of the depolarizer are reoxidized to $MnO_2$.

For this reason the depolarizer employed consists of a mixture surrounding the carbon rod and comprises essentially manganese dioxid and/or absorbent carbon and need not be changed fundamentally in designing a rechargeable dry cell although it is true a different mix or composition may be advantageously utilized, for example, one of lower pyrolusite and higher graphite content, for in a rechargeable dry cell the internal resistance is more important and the life of the depolarizer less important than in a cell designed not to be electrically recharged.

In Leclanché dry batteries, the electrolyte employed is in the form of a paste consisting approximately of twenty per cent ammonium chloride (NHCl), eighteen per cent of zinc chloride ($ZnCl_2$), twenty four per cent starch and about thirty eight per cent water. In accordance with this invention the undesirable precipitate $ZnCl_2.2NH_3$, is prevented from forming in the electrolyte and on the zinc electrode by eliminating from the electrolyte one or more of the ingredients, to wit, ammonium and chloride ions, both of which are required to form it. For this reason, as far as the present invention is concerned, no ammonium chloride is utilized. Instead, either ammonium salts or chlorides may be employed in the electrolyte but not both in the same cell.

If other ammonium salts are utilized, the $NH_3$ liberated at the carbon electrode will not have the absorbent for it, namely $ZnCl_2$, in the electrolyte and therefore the pressure of $NH_3$ will build up higher than the low value it has in the presence of $ZnCl_2$, and would polarize the cell. However, although other ammonium salts as well as the chloride thus appear to be disadvantageous in the electrolyte, it is not intended that these be excluded from the present disclosure for several of these, ammonium salts of weak or organic acids namely ammonium acetate, tartrate, lactate and formate, I have found in actual practice to work advantageously.

My experiments have disclosed that the best type of electrolyte takes the form of a relatively weak acid in order to minimize open circuit corrosion of the zinc. The use of an acid is preferable to that of a salt, because its cathode product on discharge is merely $H_2$, easily oxidized to $H_2O$ by the depolarizer. With the utilization of a salt, a hydroxide will form at the cathode on discharge, which would precipitate and clog up the cell, if insoluble, or if the hydroxide be soluble it will remain in solution in a concentrated form and act on the depolarizer and precipitate some dissolved zinc.

My experiments have demonstrated that weak or organic acids, such as tartaric and lactic acids constitute satisfactory electrolytes for dry cells adapted to be recharged electrically. However, it is to be understood that electrolytes containing salts other than those herein mentioned may be utilized with the present invention, for example, alkali metal salts of weak or organic acids, such as sodium formate, sodium acetate, etc., have been advantageously employed in connection with electrolytes for dry cell batteries adapted to be recharged in accordance with the present disclosure.

The cell battery according to the invention except for the electrolyte contains positive and negative electrodes as utilized in Leclanché dry cell batteries, the electrolyte of the present invention, however, comprises a mix having approximately twenty per cent sodium formate ($NaCO_2$), sixteen per cent zinc chloride ($ZnCl_2$), twenty eight per cent starch and thirty six per cent water. As previously pointed out, in place of sodium formate, tartaric or lactic acid may be used and the latter on service test have shown to have similar advantageous properties alluded to. According to the invention, the electrolyte remains gelatinized or moist for relatively longer lengths of time and retains its original characteristics for a greater number of operating cycles.

Many modifications of my invention will be apparent to those skilled in the art without departing therefrom or from the scope of the appended claims, the terms of which being employed for the sake of clearness rather than by way of limitation and accordingly no unnecessary limitations should be understood and the appended claims should be construed as broadly as the state of the art permits.

I claim:

1. A rechangeable dry cell of the character described comprising a zinc container which constitutes one electrode, a carbon rod inserted in said container and constituting the second electrode, a depolarizer composition interposed between the zinc container and the carbon rod and consisting essentially of granular carbon and manganese dioxide, and an electrolyte homogeneously distributed through said composition and consisting essentially of an aqueous mixture of sodium formate, zinc chloride, starch and water.

2. A rechangeable dry cell of the character described comprising a zinc container which constitutes one electrode, a carbon rod inserted in said container and constituting the second electrode, a depolarizer composition interposed between the zinc container and the carbon rod and consisting essentially of granular carbon and manganese dioxide, and an electrolytic homogeneously distributed through said composition, free from ammonium chloride, and consisting essentially of an aqueous solution of sodium formate.

CHARLES F. BONILLA.